May 20, 1969 S. TAYLOR 3,445,589

ELECTRICAL SCANNING APPARATUS

Filed June 28, 1965 Sheet 1 of 2

United States Patent Office 3,445,589
Patented May 20, 1969

3,445,589

ELECTRICAL SCANNING APPARATUS

Stanley Taylor, Sunbury-on-Thames, England, assignor to Electric & Musical Industries Limited, Hayes, England, a company of Great Britain Filed June 28, 1965, Ser. No. 467,460
Claims priority, application Great Britain, July 3, 1964, 27,487/64
Int. Cl. H04n *3/16;* H01j *31/26*
U.S. Cl. 178—7.1 7 Claims

ABSTRACT OF THE DISCLOSURE

Pick-up and scanning apparatus comprises a photo-conductive layer having a conductive signal plate applied on one surface and an array of solid state semi-conductor devices for scanning the other surface. Each semi-conductor device is a thin film triode having source, drain and gate electrodes, the source electrode of each device being in contact with the scanned surface of the photo-conductive layer and the drain and gate electrodes of the photo-conductive devices being conductively connected in groups so that the photo-conductive devices can be selectively switched to a low impedance condition to scan the photo-conductive layer.

The present invention relates to electrical scanning apparatus such as could be used in a television pick-up device. The invention relates also to pick-up and scanning apparatus.

One form of television pick-up tube is the vidicon in which a photoconductive layer is scanned by a beam of electrons form an electron gun. This tube suffers from the disadvantages of having an electron gun namely it requires an evacuated envelope, a heated cathode and focus and scanning coils. Moreover, because the electron beam has a high resistance, the photoconductive layer may be incompletely discharged unless it has a very low capacity.

It is an object of the present invention to provide scanning apparatus in which the above disadvantages are substantially removed.

According to the present invention there is provided apparatus for electrically scanning a two-dimensional array of elementary areas including an array of solid state devices each having source, drain and gate electrodes the drain electrodes each being in contact repectively with said arrays, means connecting the source electrodes together in groups and means connecting the gate electrodes together in groups whereby the conduction of said devices can be selectively determined by the selective application of electrical signals to said groups of source and gate electrodes.

According to the present invention, from a further aspect, there is provided pick-up and scanning apparatus comprising a charge storage target which is able to store discrete charges on elementary areas of one surface of the target in response to incident energy, an array of solid state semi-conductor devices for selectively discharging said charges, each said device having source, drain and gate electrodes, one of said source and drain electrodes of each device being in contact with a respective elementary area of said target surface, first means conductively connecting the other of said source and drain electrodes of said devices in groups, and second means conductively connecting the gate electrodes of said devices in groups, whereby the conduction of said devices can be selectively determined by the selective application of electrical signals to said groups of conductively connected electrodes.

In order that the present invention may be clearly understood and readily carried into effect it will now be more fully described by way of example with reference to the accompanying drawing, in which.

Figure 1:
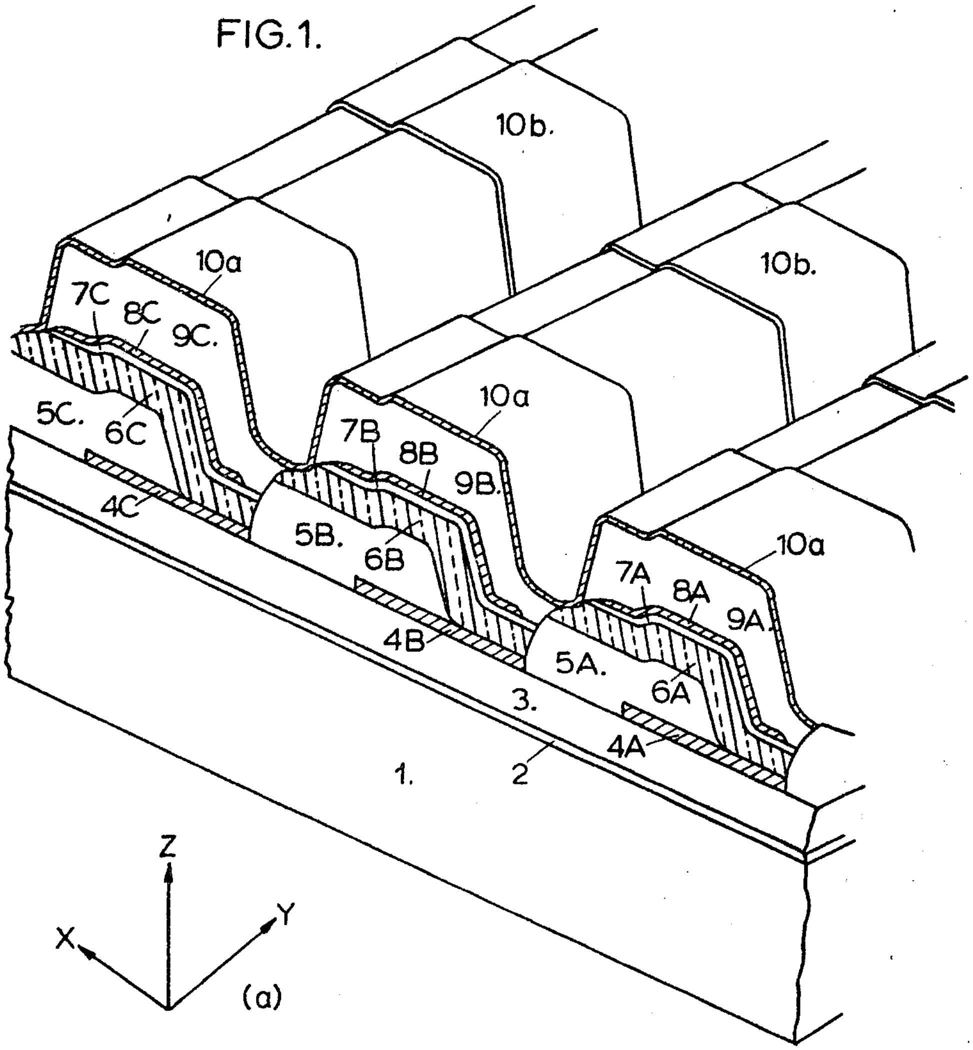
FIGURE 1 shows part of an arrangement according to the invention.

Referring to FIGURE 1, on the transparent substrate 1 there is deposited a transparent conducting signal plate 2 and a photo-conductive layer 3 as in a vidicon television pick-up tube. On the layer 3 there is formed an array of conducting elements 4A, 4B . . . For the sake of convenience the arrangement will be described with reference to the co-ordinate system shown at (*a*) in the figure. For each element 4 there is provided a layer of insulator 5 which extends in the Y direction as shown in the figure, so that the layer is common to the elements of a group. Layers of semiconducting material 6 are then deposited on the elements 4 and insulator 5 as shown in the figure so as to connect with the elements 4. A thin layer of insulator 7 is formed on top of each of the semiconducting layers 6 to leave exposed only the ends of the layers 6 remote from those contacting the elements. A plurality of conducting strips 8 extending in the Y direction are formed on top of the layers 7 so as not to connect with with the corresponding semiconducting layer 6 and further layers 9 of insulator are formed on top of the layers 7 and 8 still leaving the ends of the layer 6 remote from the elements 4 to which they are connected exposed. Strips of conductor 10*a*, 10*b* . . . extending in the X direction are then formed on top of the layers 9 connecting with the exposed portions of the layers 6. The conductors 10 and the elements 4 respectively form source and drain electrodes for the semiconductor layers 6 and the strips 8 act as gate electrodes for conduction through the semiconductor layers 6. Thus associated with each element 4 there is a semiconductor device known as a thin film triode of which the element 4 forms the drain electrode, the gate electrodes are connected together in the Y direction because they are formed of the strips 8 and the source electrodes are connected together in the X direction because they are formed of the strips 10.

When a picture is focussed on the photoconductive layer 3, where light falls the potential of the side of the layer 3 remote from the signal plate 2 rises from an initial level of zero volts towards the potential of the signal plate 2, say about 20 volts. During a frame period this potential rise is typically about 5 volts. When the photoconductive layer 3 is not being scanned the source electrodes 10 are floating and the gate electrodes 8 are connected to a sufficiently layer negative voltage say −10 volts to render all the semiconductor large non-conducting or at least of higher resistance than the photoconductor of the layer 3 when unilluminated. In this condition the potential on the drain electrodes 4 rises with time.

During scanning the source electrodes 10 are connected in turn to zero volts. The gate electrodes receive in sequence pulses of 20 volts amplitude so that the potential on them rises to +10 volts and returns to −10 volts. The source conductors are maintained at zero volts for one line period each and the gate electrodes are maintained at +10 volts for an element period so that the line scan direction is X and the frame scan direction is Y. Whilst each gate electrode is at +10 volts the associated semiconductor elements are conducting and therefore the stored charge on the drain electrode associated with the source conductor which is connected to zero volts is removed and forms the signal current. Thus during the time when a particular drain electrode is not being scanned it is electrically floating and its potential will rise according to the light intensity at that part of the photoconductive layer 3; this means that the target works in the full frame storage mode.

Figure 2:
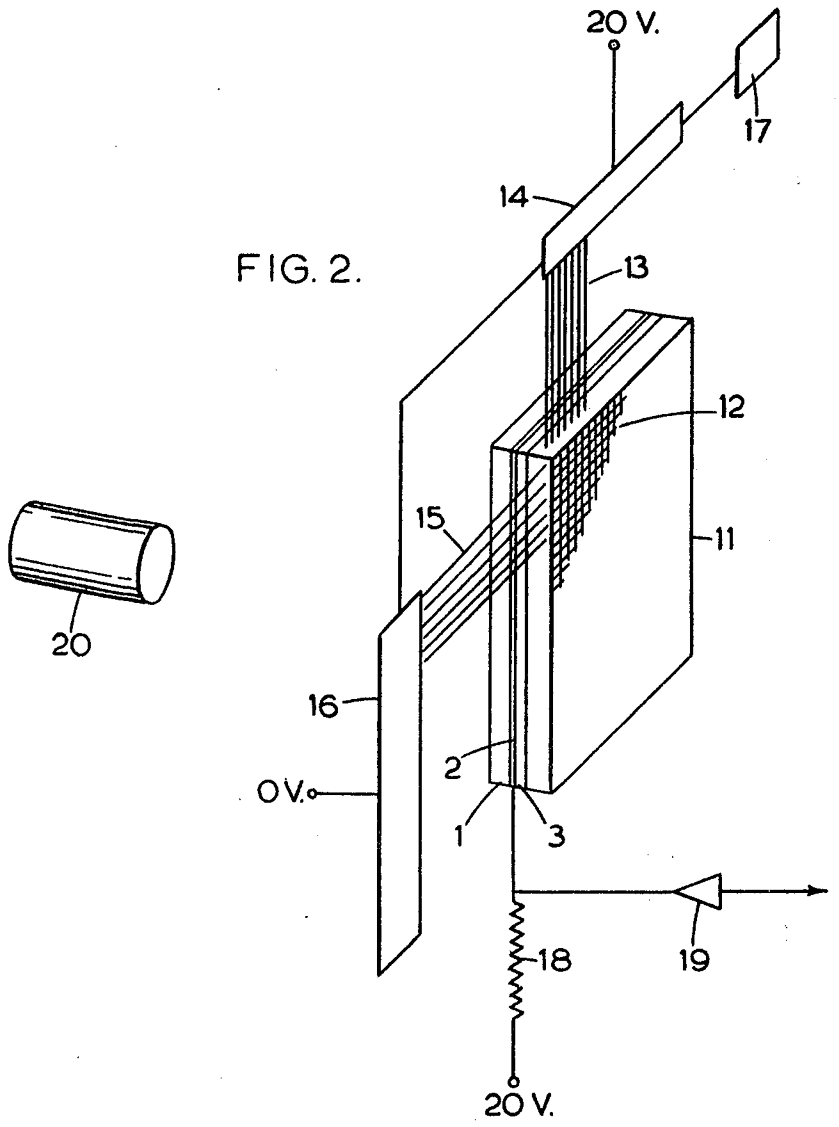
FIGURE 2 shows a television camera including a scanning apparatus according to the invention.

FIGURE 2 illustrates an arrangement of the invention when it is used in a television camera. Parts illustrated in FIGURE 1 are denoted by the same reference numeral when they are shown in FIGURE 2. An arrangement as shown in FIGURE 1 is indicated by the reference 11 and the array of solid state devices is indicated symbolically at 12 and to simplify the drawing only those devices occupying a portion of the area are shown although in fact they occupy the whole area. Furthermore the density of the array is much greater than can readily be shown in the figure. When the camera is to be used for generating television signals according to C.C.I.R. standards there are approximately 625 x 625 x 4/3 such devices, that is a matrix 625 units high by 625 x 4/3 units wide. The gate electrodes of all the devices in each column are connected to leads, that is, one lead for each column and a few of such leads are indicated at 13. For the standards mentioned there are 625 x 4/3 such leads although to simplify the drawing only a few are shown. The leads are connected to a ring counter indicated by the block 14 which is controlled by an oscillator indicated by the block 17. The ring counter serves in the manner of a commutator to connect each lead in turn to a 20 v. supply the stepping being effected under the control of the oscillator 17 so that all the leads are so connected during the time for one line period.

In a similar manner the source electrodes of all the devices in each row are connected to leads, that is, one lead for each row, a few of such leads being shown at 15. For the standards mentioned there are 625 such leads although to simplify the drawing only a few are shown. The leads are connected to a ring counter, indicated by the block 16, which serves as a commutator to connect each lead in turn to a zero volt supply. Each lead is thus connected for the duration of a line period and the counter is stepped by a pulse received from the counter 14 at the end of each cycle of operation of that counter.

An image of the scene to be televised is formed on the photoconductive layer 3 by the lens 20 and, as already indicated, the photoconductive elements associated with each of the array of devices are discharged in turn. The output signal is obtained from a resistor 18 which connects the signal plate 2 to a source of bias which as shown is 20 v., but which will generally be made adjustable. The junction of the signal plate and the resistor is connected to the amplifier 19 which serves as the head amplifier of the camera.

The portion including the layers 1, 2 and 3 and the semiconductor devices may be enclosed in an evacuated transparent envelope.

In a typical example of the invention the photoconductive layer 3 consists of lead oxide or antimony tri-sulphide deposited in a vacuum to form a solid layer. The semiconductor material of the layers 6 may be cadmium sulphide. The drain electrodes 4, gate electrodes 8 and the source electrodes 10 may be aluminum and the insulating layers may conveniently be of silicon monoxide. If desired a barrier layer may be formed on the photoconducting layer 3 and the drain electrodes 4 placed on the barrier layer. The thin film triodes may most conveniently be formed by vacuum evaporation of the various substances through suitable masks.

The thin film triode should have a resistance for its cut off condition which is say 10 times that of the unilluminated photoconductor. In its conductive condition the thin film triode should be say 10 times more conductive than the illuminated photoconductive. Thus the thin film triode preferably has a ratio of resistance between its conducting and non-conducting conditions of 1 to $10^4$, if the photoconductor resistance charges by a factor of $10^2$ on illumination.

The speed at which a charge on a drain electrode can be removed by a semiconductor is determined by the dielectric relaxation time of the semiconductor which is equal to $E_s\rho_{on}\times 10^{-13}$ where $\rho_{on}$ is the "effective" resistivity of the thin film triode in the "on" condition and $E_s$ is the dielectric constant of the semiconductor. This can be at least as fast as charge removal by an electron beam.

The array of thin film triodes performs exactly the same functions as the electron beam in a vidicon pick-up tube but because the resistance of the electron beam is of the order of 10 megohms the arrangement of the invention has the advantage that the capacity lag which arises because of the high impedance of the electron beam is substantially reduced since the impedance of the conducting thin film triode is very much less than 10 megohms. Moreover, quite large capacity photoconducting layers could be discharged by an arrangement according to the invention without the appearance of discharge lag effects, hence materials with very high optical absorptions and short carrier range may be used as photoconductors.

Although the invention has been described with respect to a specific embodiment it is by no means limited to this embodiment and many other arrangements using the invention will be apparent to those skilled in the art. For example, although in the example described the scanning is effected by the application of electrical signals to electrodes of said devices, it may be effected by the application sequentially of beams of radiation.

What is claimed is:

1. Apparatus for electrically scanning a two-dimensional array of elementary areas including an array of solid state devices each having source, drain and gate electrodes the drain electrodes each being in contact respectively with said areas, means connecting the source electrodes together in groups and means connecting the gate electrodes together in groups whereby the conduction of said devices can be selectively determined by the selective application of electrical signals to said groups of source and gate electrodes.

2. Apparatus for scanning a surface according to claim 1 in which said connecting means includes first means conductively connecting the source electrodes of all said devices in columns, and further means conductively connecting the gate electrodes of all said devices in rows, whereby the conduction of an individual device can be determined by the selective application of electrical signals to said first and second conductively connecting means.

3. Pick-up and scanning apparatus comprising (a) a charge storage target which is able to store discrete charges on elementary areas of one surface of the target in response to incident energy, (b) an array of solid state semi-conductor devices for selectively discharging said charges, (c) each said device having source, drain and gate electrodes, (d) one of said source and drain electrodes of each device being in contact with a respective elementary area of said target surface, (e) first means conductively connecting the other of said source and drain electrodes of said devices in groups, and (f) second means conductively connecting the gate electrodes of said devices in groups, whereby the conduction of said devices can be selectively determined by the selective application of electrical signals to said groups of conductively connected electrodes.

4. Apparatus according to claim 2 in which said target comprises a layer of which the electrical conductivity is responsive to incident radiation, and a conductive electrode in contact with one surface of said layer, one of said source and drain electrodes of each solid state device being in contact with an elementary area of the other surface of said layer.

5. Apparatus according to claim 3 in which said solid state devices are evaporated thin film triode devices.

6. Apparatus according to claim 3 including commutating means for selectively applying electrical signals to said first conductively connecting means and said second conductively connecting means so that said elementary areas of said target surfaces are discharged in a prearranged order.

7. Pick-up and scanning apparatus comprising (a) a charge storage target which is able to store discrete charges on elementary areas of one surface of said target in response to incident energy, (b) an array of solid state switching devices each having at least a first electrode and a second electrode for selectively discharging said charges, (c) the first electrode of each switching device being in conductive connection with a respective elementary area of said surface, (d) said switching devices each having normally a high impedance between said first and second electrodes, and (e) means for selectively switching said devices to a condition of low impedance between said first and second electrodes whilst the second electrode is connected to a reference potential, thereby to scan said surface.

References Cited

UNITED STATES PATENTS

| | | | |
|---|---|---|---|
| 2,908,835 | 10/1959 | Weimer | 315—10 |
| 3,051,840 | 8/1962 | Davis | 250—211 |
| 3,111,556 | 11/1963 | Knoll et al. | 178—7.1 |

ROBERT L. GRIFFIN, *Primary Examiner.*

ALFRED H. EDDLEMAN, *Assistant Examiner.*

U.S. Cl. X.R.

315—10